(No Model.)

S. BARR.
Compound for Manufacture of Gas Tubing.

No. 236,480. Patented Jan. 11, 1881.

Attest:
Charles R. Searle
L. Fayo.

Samuel Barr,
Inventor:
By Worth Osgood
Attorney.

UNITED STATES PATENT OFFICE.

SAMUEL BARR, OF PROVIDENCE, RHODE ISLAND.

COMPOUND FOR MANUFACTURE OF GAS-TUBING.

SPECIFICATION forming part of Letters Patent No. 236,480, dated January 11, 1881.

Application filed December 3, 1879.

*To all whom it may concern:*

Be it known that I, SAMUEL BARR, of Providence, county of Providence, and State of Rhode Island, have invented certain new and useful Improvements in Compounds for Manufacture of Gas-Tubing, &c., of which the following is a full, clear, and exact description, reference being had to the accompanying drawings, and to the letters of reference marked thereon.

Figure 1:
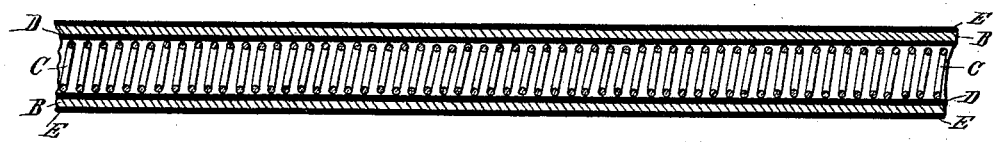
Figure 2:
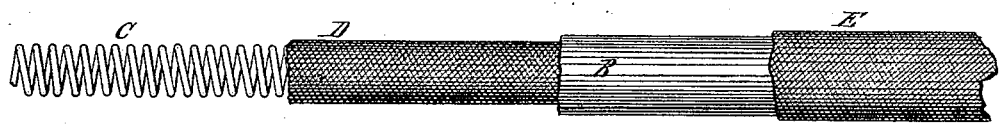
Figure 3:
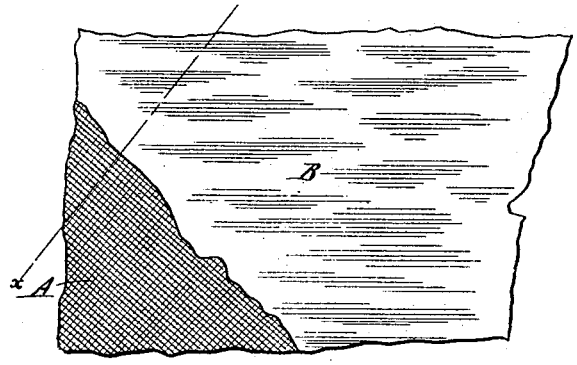
Figure 4:
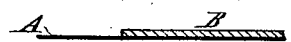

Figure 1 is an axial section of a flexible gas-conducting or other tube having my improved compound applied thereto. Fig. 2 is an elevation of the same, showing the different parts removed for short distances. Fig. 3 is a plan of a fragment of cloth made gas-proof by the application of my improved compound, a portion of the foundation fabric being exposed; and Fig. 4 is a sectional view upon a plane passing through line $x\ x$ of Fig. 3.

Like letters of reference, wherever they occur, indicate corresponding parts in all the figures.

The ordinary compounds of glue and glycerine heretofore used in the manufacture of gas-tubing and other articles are easily affected by moisture and heat, and after exposure for a little time to the deteriorating effects of gas by becoming corroded or eaten away, so as to render them inefficient to confine the gas. The sensibility to effects of heat and moisture renders the tubing, &c., useless in warm or moist climates, or in warm or moist situations about the building in which used, and these deteriorating effects destroy the desired durability of the article, the compound being by them (one or both) caused to "run" and leave bare spots upon the foundation, through which the gas, &c., exudes quite freely.

It is the purpose or object of my invention to produce a compound which, when used in the situations indicated, will remain unaffected by any change in the ordinary temperature of the air or even by moderate degrees of heat, such as produced by the flame of a gas-burner, by a stove, steam-heater, or other heating contrivance with which gas-tubes in ordinary domestic use are liable to come in contact, and which will at the same time be indestructible by or proof against the action of the chemical constituents of ordinary coal-gas. To accomplish this the invention involves certain new and useful combinations of ingredients, all of which will be hereinafter first fully described, and then pointed out in the claims.

To manufacture my improved compound I take of ordinary glue ten pounds; of glycerine, twelve pounds; of common soap, four ounces; of borax, one ounce; of copperas, (sulphate of iron,) three-fourths of an ounce, and mix with sufficient water, using sufficient heat to form a thick paste.

This paste or compound so produced will withstand the effects of moisture, of ordinary degrees of heat, and of common coal-gas, as before intimated.

The proportions of ingredients given are the best known to me; but of course they may be slightly varied without departing from the principles of the invention or producing any essentially different composition. It may be made harder or softer, according to the requirements of its proposed use, by varying the proportions of the ingredients.

To apply this compound it is simply spread upon the foundation, whatever it may be, in a layer or in successive layers as thick as may be desired, and then allowed to thoroughly dry for at least twenty-four hours, when it is ready for use if preferred in that state, the fabric being coated or covered with a layer of the improved compound, and thus made impervious to water or gas. The drying may be accomplished by simple exposure to the atmosphere or by exposure in a drying-room. In the latter case the preparation of the material is economical as compared with the previously known compounds of glue and glycerine, because of the little time required to complete the drying. A good effect upon the compound may be produced by passing it rapidly through boiling water.

Instead of using the compound as thus prepared and finished, I find it better, on account of the greater durability and increase of heat-resisting properties, and particularly moisture-resisting properties, communicated, to apply a varnish or outside coating made in the following manner: Take of bichromate of potash one ounce, and of water twelve ounces; mix thoroughly, and add twelve ounces of linseed-oil, agitating until all are thoroughly incorporated, producing a thick yellow varnish or emulsion. This varnish may be applied to the compound after it is dried as above.

In place of the bichromate of potash named, tannic acid, alcohol, and linseed-oil might be used. Bichromate of ammonia might be used, or chromate of soda, or chromate of magnesia, or chromic acid with aqua ammonia. In fact, any of the well-known equivalents might be employed; and, as in reference to the compound, the exact proportions given, though the best known to me for the purpose, are not to be regarded as invariable.

I prefer to use the bichromated linseed-oil instead of the bichromate and water alone, not only on account of the properties before mentioned, but also because it flows more evenly and does not leave bare or unvarnished spots, and also because it adds greatly to the moisture-resisting qualities of the compound.

As an indication of the general adaptability of the invention, a fragment of coated cloth is represented in Figs. 3 and 4. The foundation A, of any suitable cloth or fabric, being suitably stretched, has one or more coatings of the compound B applied with the brush or otherwise. The whole is dried for twenty-four hours or more, and may then be varnished with the bichromated oil, used as before stated, or it may be left simply in the dried state.

Except as hereinafter specially claimed, I propose to make separate applications for Letters Patent covering the application of my improved compound to the manufacture of various articles.

In the manufacture of gas-tubing the ordinary coiled-wire or interior spring or core C is covered with a woven or braided fabric, D, after the ordinary customs, and a layer of my improved compound B applied thereto. After being suitably dried the compound is varnished with the bichromated linseed-oil described above, after which the woven or braided exterior covering, E, is applied for the purpose of further protecting the tubing and affording an agreeable exterior surface for appearance and handling. The tubing so constructed has all the advantages of flexibility of any as heretofore constructed, of a simple mixture of glue and glycerine, and possesses also greater durability, more perfect gas confining and resisting qualities, and greater heat and moisture resisting capabilities.

I am aware of the previous existence of a compound consisting of glue, glycerine, borax, soap, and alum employed for water-proofing cloth, and I make no claim to such a compound.

Having thus fully described my invention, what I claim as new, and desire to secure by Letters Patent, is—

The herein-described compound, composed of glue, glycerine, soap, borax, copperas, and water, united in about the proportions named, and for the purposes set forth.

In testimony that I claim the foregoing I have hereunto set my hand in the presence of two witnesses.

SAMUEL BARR.

Witnesses:
SAML. T. DOUGLAS,
LEWIS E. HEATON.